Patented Feb. 26, 1935

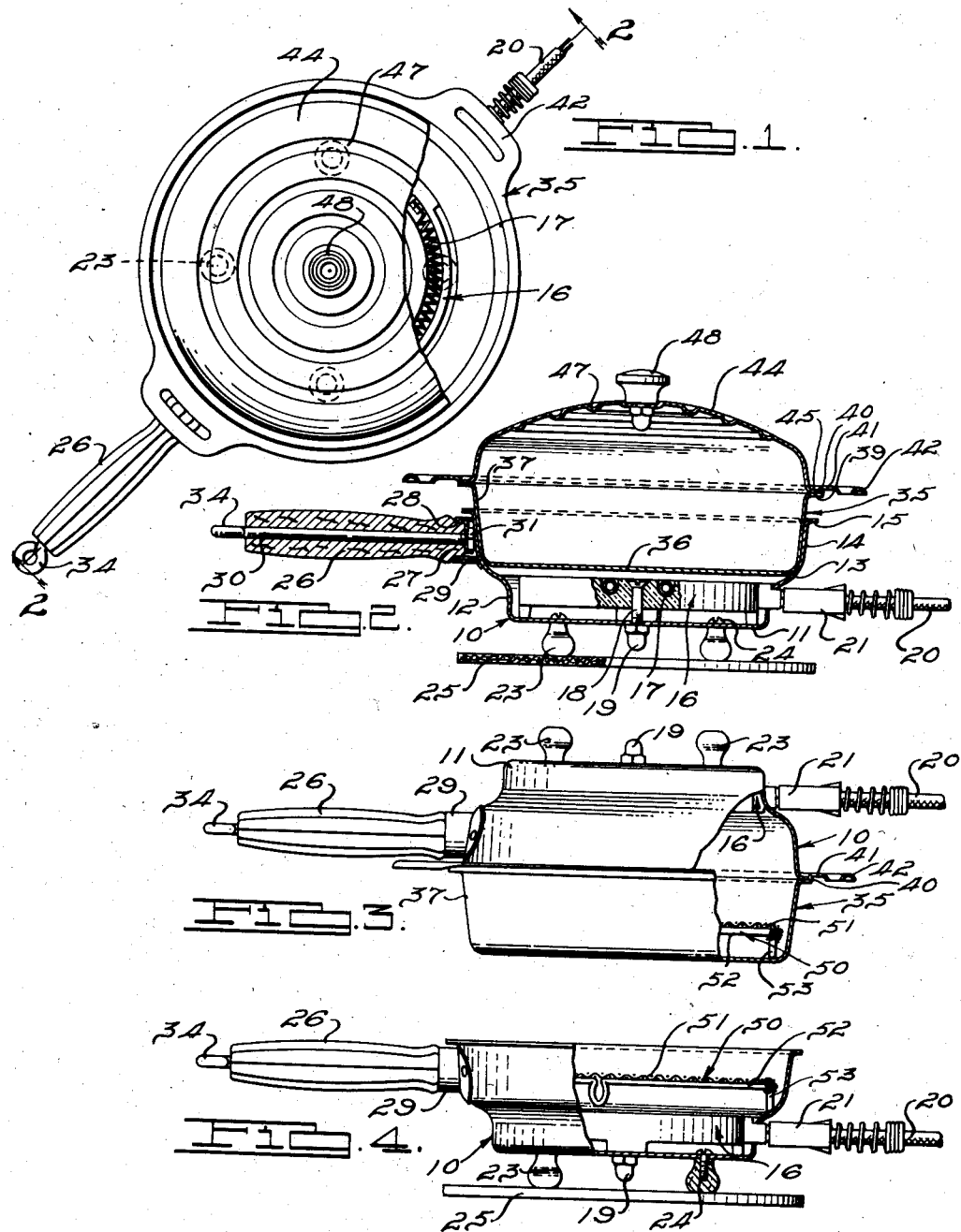

1,992,843

UNITED STATES PATENT OFFICE 1,992,843

ELECTRIC UTENSIL

Russell A. Serenberg, Charles Marienthal, and Paul Marienthal, Detroit, Mich., assignors to Steel Materials Company, a corporation of Michigan Application January 6, 1934, Serial No. 705,478

4 Claims. (Cl. 219—43)

The invention relates to multipurpose electric utensils and it has particular relation to an electric cooking utensil.

One object of the invention is to provide an electric cooking utensil or unit comprising several parts that may be operatively associated in various ways to provide different combinations that may be used for preparing different foods in different ways, thereby enabling the housewife or user of the utensil to prepare practically any kind of cooked food with the same unit.

Another object of the invention is to provide an electrical cooking unit which readily is adaptable for broiling and roasting of foods as well as cooking and warming foods in the ordinary way.

Another object of the invention is to provide a utensil such as mentioned, wherein one part is provided with an electrical heating unit and wherein this part may be used as an electrical heater for small rooms and the like whenever desired.

Other objects of the invention will become apparent from the following description, the drawing relating thereto, and the claims hereinafter set forth.

For a better understanding of the invention, reference may be had to the drawing illustrating one form of the invention, wherein:

Figure 1 is a top plan view of an electric cooking utensil constructed according to one form of the invention, with a part of the construction broken away to illustrate certain details.

Fig. 2 is a cross-sectional view taken substantially along the line 2—2 of Fig. 1, and also illustrating a heat insulating pad provided for disposal under the utensil.

Fig. 3 is a side view partly broken away to illustrate details, showing how two parts of the utensil are combined in a different way to provide a broiler.

Fig. 4 illustrates that part of the utensil having the heating unit, in conjunction with a grill rack that may be employed to make toast or support a coffee pot or the like which is to be heated.

Referring to Fig. 2, a receptacle or base pan 10 is provided which has a flat base 11, an annular and substantially cylindrical wall portion 12 and an arcuate wall portion 13 disposed in flaring relation to the wall portion 12. The arcuate wall portion 13 terminates in a lesser flared portion 14 that in turn, terminates at its upper edge in a laterally directed, short lip flange 15. Within the receptacle, and substantially in the plane of the wall portion 12, an electrical heating unit 16 is provided which comprises a plate of insulating material having grooves in its upper surface for receiving a heating coil 17. The plate has a plurality of legs supporting it in spaced relation to the base 11 and is secured to the base by means of a bolt 18 passing through the latter and which is provided with an acorn nut 19 on its outer end. Electric current may be conducted through the coil 17 from a conventional cord 20 having a socket plug 21 which may releasably be associated with a pair of rigid terminals projecting through a portion of the insulating plate 16 that also extends through an opening in the side wall 12 of the receptacle.

For supporting the receptacle on a plane surface, a plurality of knobs 23 constructed of insulating material, are provided, and each of these knobs may be secured to the base 11 by a screw 24. In using the receptacle on a plane surface, it is preferred to provide a pad 25 composed of insulating material such as an asbestos composition, for the purpose of preventing the conduction of heat to a table surface or the like. The receptacle may be manually manipulated by means of a wooden handle 26 having a polygonal portion 27 that is adapted to project into a polygonal socket 28 formed in the wall of a cap 29 that may be riveted or otherwise secured to the wall portion 14 of the receptacle. For securing the handle releasably to the receptacle, a metal rod 30 extends lengthwise therethrough and through the wall of the cap 29, and such rod is threaded into a nut 31 which is non-rotatably associated with the cap and is disposed between the wall 14 of the receptacle and the wall of the cap. The outer end of the rod has an eye 34 to facilitate threading it into the nut and also to provide a means for suspending the receptacle from a nail or the like.

The receptacle 10 is adapted to receive a second receptacle or intermediate pan 35 having a base 36 and a slightly flaring side wall 37 that is complementary to the wall portion 14 of the first receptacle. It will be apparent that the arcuate wall portion 13 of the first receptacle constitutes a support for the second receptacle and limits its downward movement. The receptacle 35 terminates at its upper edge in a laterally projecting flange 39 that in turn, terminates in an upwardly projecting portion 40 that in turn joins a laterally projecting flange 41. At diametrically opposite sides, tabs 42 are provided for facilitating manual manipulation of the second receptacle.

For covering the second receptacle, a cover pan 44 is provided which terminates at its lower edge in a laterally projecting flange 45 that is adapted to fit the flange 39 on such second receptacle, and within the upwardly projecting portion 40. This fitting arrangement prevents lateral movement of the cover once it is disposed in proper position. The cover is provided with spaced, annularly extending and inwardly projecting beads 47 and these constitute drip beads for preventing condensed moisture collecting on the inner surface of the cover from flowing down to the edge thereof. It will be appreciated that this condensed moisture as it tends to flow down the inner side of the cover toward its edge, will form into drops on the beads and drop into the receptacle 35. During the roasting of meats in the receptacle 35, the dropping of these beads of moisture is advantageous in the basting of the meat. The cover also is provided with a knob 48 secured thereto at its center which preferably is constructed of wood or insulating material so as to facilitate manual manipulation of the cover.

The construction as thus described and illustrated by Fig. 2, is particularly adapted for roasting meats or the like, although various foods may be prepared as will be readily evident. During the preparation of roasts, for example, the electrical heating unit supplies heat to the receptacle 35 through its base 36, and during cooking of the roast, evaporating moisture collects on the inner surface of the cover and finally forms drops on the beads 47 which fall upon the roast. In this manner the construction is useful in the basting of the roast.

For broiling meats or the like, the arrangement may be used as shown by Fig. 3, wherein the cover 44 is not used, and the receptacle 35 is disposed on the heating pad or any other suitable surface and the receptacle 10 provided with the heating unit, is inverted and associated with the receptacle 35 in the same manner that the cover 44 is associated with the receptacle as shown by Fig. 2. In this connection it may be pointed out that the lip flange 15 on the receptacle 10 corresponds in size and shape to the flange 45 on the cover and hence when the receptacle is inverted it may fit the receptacle 35 in the same way that the cover 44 fits such receptacle. In the broiling of meats with this arrangement, a grill rack 50 is provided which comprises intermeshing wires 51 that are connected by soldering or the like to an annular wire ring 52 having loop portions 53 formed therein that constitute supporting legs. With this grill rack provided in the receptacle 35, the meat to be broiled is disposed on the rack and during the broiling process, juices of the meat drip below the rack and collect on the base of the receptacle. After broiling of the meat, such juices may be used in the making of gravy. In the use of this arrangement and as described, the flaring walls 13 and 14 of the receptacle 10 are useful in properly directing the heat rays downwardly into the receptacle.

In the arrangement shown by Fig. 4, the receptacle 10 alone is used and the grill rack 50 may be disposed therein as shown with the legs 53 supported on the arcuate wall portion 13. With this arrangement, bread may be toasted by placing it on the grill rack or a pot of coffee may be heated or various other foods and liquids may be heated as will be evident. An advantage of the rack in the making of toast is that it is large enough to enable making a plurality of slices of toast as the rack is sufficiently large to accommodate a plurality of slices of bread.

The receptacle 10 may be used alone for heating a room, as the eye 34 on the handle rod 30 is adapted to be hung on a nail or the like so as to suspend the receptacle in a vertical position. When so suspended, heat from the heating unit is directed outwardly particularly by the flaring walls 13 and 14 and the article may be used in this manner for rapidly conducting heat to remote parts of a room. Additionally, the article may be used for drying the hair after washing, as the handle facilitates manual manipulation thereof for this purpose. Various other uses will become evident during use of the construction.

The receptacles and cover preferably are constructed of sheet metal stamped by means of well known stamping operations, and after construction, the metal preferably is chrome plated to provide a finished appearance, and a surface which will retard rust. Furthermore, the chrome plating avoids undesirable effects occasionally encountered in cooking in vessels constructed of ordinary sheet metal and particularly avoids odors resulting from applying heat to such metal.

The invention provides an article particularly useful in cooking, and which has many purposes and uses and it seems evident that the many uses to which the invention may be applied renders it extremely appealing to the housewife or other person who desires to prepare a meal quickly or perform other operations such as mentioned, without involving much trouble. It is evident that the invention provides a means for preparing foods practically in any way with a single arrangement, and that in general, the invention is highly useful, while at the same time possessing the characteristics of simplicity and inexpensiveness.

While only one form of the invention has been illustrated and described in detail, it will be apparent to those skilled in the art that various modifications may be made without departing from the scope of the appended claims.

What is claimed is,

1. A multi-purpose electric cooking utensil comprising a shallow base pan having a base, an open top, and peripheral side wall, an electric heating unit securely mounted therein on its base, a shallow intermediate pan separate and independent from the base pan and adapted to fit therein right side up and be supported thereby clear of said unit with its edge considerably above and clear of that of the base pan, and having an imperforate flat base, a peripheral side wall, and an open top, said pans having edges complementary in shape and size so that they may be engaged in a manner to provide a roaster, with the intermediate pan in the base pan, or to provide a covered, downwardly heating broiler, with the base pan inverted over and covering the intermediate pan with its edge resting on the edge of the intermediate pan.

2. A multi-purpose electric cooking utensil comprising a shallow base pan having a base, an open top, and peripheral side wall, an electric heating unit securely mounted therein on its base, a shallow intermediate pan separate and independent from the base pan and dimensioned to fit therein right side up and be supported thereby clear of said unit with its edge considerably above and clear of that of the base pan, and having an imperforate flat base, a peripheral side wall, and an open top, said base pan and said intermediate pan having similarly shaped and dimensioned complementary edges so that the base pan, when inverted over the intermediate pan, with its edge resting on the edge of the intermediate pan, may be utilized to form a downwardly heating broiler, with the base pan covering the intermediate pan.

3. In combination with a device of the character described in claim 1, a cover pan for said intermediate pan and having an edge complementary in shape and size to that of the intermediate pan.

4. In combination with a device of the character described in claim 2, a cover pan for said intermediate pan and having an edge complementary in shape and size to that of the intermediate pan.

RUSSELL A. SERENBERG.
CHARLES MARIENTHAL.
PAUL MARIENTHAL.